United States Patent
Lee et al.

(10) Patent No.: US 10,564,601 B2
(45) Date of Patent: Feb. 18, 2020

(54) METHOD AND SYSTEM FOR IMAGE PROCESSING AND DATA TRANSMISSION IN NETWORK-BASED MULTI-CAMERA ENVIRONMENT

(71) Applicant: HANKYONG INDUSTRY ACADEMIC COOPERATION CENTER, Anseong-si (KR)

(72) Inventors: Ho Won Lee, Anseong-si (KR); Hyun Ho Choi, Anseong-si (KR); Myung Jin Cho, Anseong-si (KR)

(73) Assignee: HANKYONG INDUSTRY ACADEMIC COOPERATION CENTER, Anseong-si (KR)

( * ) Notice: Subject to any disclaimer, the term of this patent is extended or adjusted under 35 U.S.C. 154(b) by 241 days.

(21) Appl. No.: 15/445,544

(22) Filed: Feb. 28, 2017

(65) Prior Publication Data
US 2017/0248916 A1 Aug. 31, 2017

(30) Foreign Application Priority Data
Feb. 29, 2016 (KR) .......................... 10-2016-0024155

(51) Int. Cl.
*H04N 19/597* (2014.01)
*H04N 19/59* (2014.01)
(Continued)

(52) U.S. Cl.
CPC .............. *G03H 1/08* (2013.01); *G03H 1/0005* (2013.01); *G06K 9/6267* (2013.01); *G06T 7/11* (2017.01); *G06T 7/55* (2017.01); *G06T 7/593* (2017.01); *H04N 7/181* (2013.01); *H04N 13/106* (2018.05); *H04N 19/59* (2014.11);
(Continued)

(58) Field of Classification Search
CPC .... H04N 13/106; H04N 19/597; H04N 19/59; H04N 19/593; H04N 7/181; G06T 7/11; G06T 7/55; G06T 7/593
See application file for complete search history.

(56) References Cited

U.S. PATENT DOCUMENTS 6,477,267 B1 * 11/2002 Richards ............ G02B 27/2228
382/154
2009/0129465 A1 * 5/2009 Lai ....................... H04N 19/597
375/240.02
(Continued)

FOREIGN PATENT DOCUMENTS

| KR | 20110044419 A | 4/2011 |
| KR | 20110119709 A | 11/2011 |
| KR | 20150079905 A | 7/2015 |

*Primary Examiner* — Robert J Hance
(74) *Attorney, Agent, or Firm* — Seed Intellectual Property Law Group LLP (57) ABSTRACT

Disclosed are a method and a system for image processing and data transmission in a network-based multi-camera environment. The inventive concept provides a real-time high-efficiency 3D/hologram image service to the user through an in-network computing technology. In detail, the inventive concept minimizes loss of a quality of a final 3D/hologram image while reducing an amount of information that is to be transmitted through processing of a plurality of cameras by allowing information captured by the cameras to be efficiently processed and transmitted when the cameras cooperate with each other to produce a 3D/hologram image.

13 Claims, 10 Drawing Sheets

(51) Int. Cl.
  *G06T 7/11* (2017.01)
  *G03H 1/08* (2006.01)
  *H04N 19/593* (2014.01)
  *G06T 7/55* (2017.01)
  *G06T 7/593* (2017.01)
  *H04N 13/106* (2018.01)
  *G03H 1/00* (2006.01)
  *G06K 9/62* (2006.01)
  *H04N 7/18* (2006.01)

(52) U.S. Cl.
  CPC ......... *H04N 19/593* (2014.11); *H04N 19/597* (2014.11); *G03H 2001/0088* (2013.01); *G03H 2210/33* (2013.01); *G03H 2226/02* (2013.01); *G03H 2226/04* (2013.01)

(56) References Cited

U.S. PATENT DOCUMENTS

| | | | |
|---|---|---|---|
| 2011/0227912 A1* | 9/2011 | Sugama | H04N 13/275 345/419 |
| 2013/0250040 A1* | 9/2013 | Vitsnudel | H04N 5/23238 348/36 |
| 2014/0192154 A1* | 7/2014 | Jeong | H04N 19/597 348/43 |
| 2015/0350678 A1* | 12/2015 | Shimizu | H04N 19/523 375/240.16 |
| 2016/0373722 A1* | 12/2016 | Mishra | G06T 1/0028 |
| 2018/0027258 A1* | 1/2018 | Tech | H04N 19/597 375/240.16 |

* cited by examiner

| Camera | H | K | N | U |
|---|---|---|---|---|
| (1,1) | 0 | 0 | 0 | 0 |
| (2,1) | 9 | 8 | 6 | 6 |
| (3,1) | 11 | 8 | 7 | 5 |
| (4,1) | 10 | 7 | 6 | 5 |
| (5,1) | 10 | 8 | 6 | 6 |
| (6,1) | 11 | 8 | 7 | 5 |
| (7,1) | 10 | 8 | 6 | 6 |
| (8,1) | 10 | 8 | 7 | 5 |
| (9,1) | 10 | 8 | 6 | 6 |
| (10,1) | 10 | 8 | 7 | 5 |
| average | 10.11 | 7.89 | 6.44 | 5.44 |

FIG. 10

METHOD AND SYSTEM FOR IMAGE PROCESSING AND DATA TRANSMISSION IN NETWORK-BASED MULTI-CAMERA ENVIRONMENT

BACKGROUND

Embodiments of the inventive concept described herein relate to a technology for image processing and data transmission in a network-based multi-camera environment.

As the distribution of mobile devices has increased geometrically and the technologies for mobile devices have developed, needs for the development of various contents using the technologies also has increased. Accordingly, the content has developed to 3D/hologram content that provides more various experiences to a user, and as the electronic devices that provide 3D/hologram content are currently distributed and the needs for such electronic devices are gradually increasing, various studies for providing better 3D/hologram content to the users are being required.

In particular, studies on a technology of wirelessly transmitting 3D/hologram content by a mobile device are necessary. An existing system that distributes 2D content, for example, a site such as You Tube distributes 2D content after storing the 2D content in a server. However, systems that uploads 3D/hologram content in real time and reproducing 3D/hologram content stored in a server or the like in a mobile environment have not been sufficiently developed yet.

Accordingly, development of a system that may rapidly convert 2D content to 3D/hologram content and rapidly transmit the 3D/hologram content on a wireless network in real time is necessary. As an example, Korean Patent Application Publication No. 2011-0044419 (entitled "Cloud Computing based Image Manufacturing System, Method for Manufacturing Image, and Apparatus for performing the Same") suggests an apparatus for manufacturing an image based on cloud computing, wherein an application for manufacturing an image is mounted on the apparatus, a terminal device may manufacture a 3D image by using an image manufacturing resource provided in a service apparatus through a network, a content providing unit may provide content to the terminal device through the network, and a cloud computing unit allocates a resource for the terminal device.

A 3D/hologram image service is one of core services, together with the future 5G mobile communication. However, as compared with an existing 2D image, transmission of a 3D/hologram image requires a large amount of wireless resources.

It is a very important study issue for improving an efficiency and performance of a network to reduce an amount of wireless resources that are necessary for transmission of a 3D/hologram image on a wireless link.

SUMMARY

Embodiments of the inventive concept provide a system and a method for image processing and data transmission in a network-based multi-camera environment that may efficiently process and transmit information captured by a plurality of cameras when the cameras cooperate with each other to produce a 3D/hologram image.

Embodiments of the inventive concept also provide a system and a method for image processing and data transmission in a network-based multi-camera environment that may maintain a quality of a final 3D/hologram image that is provided to a user while reducing an amount of information that is to be transmitted through processing of cameras.

In accordance with an aspect of the inventive concept, there is provided a method implemented by a computer, including compressing, by at least one of a plurality of cameras that produce a plurality of 2D images for a common target, image information for the plurality of 2D images produced by the plurality of cameras by using a spatial correlation between the plurality of 2D images.

The compressing of the image information may include determining at least one representative image by using a compression operation of determining one representative value based on a plurality of values for the 2D images having the spatial correlation.

The method may further include transmitting, by the at least one camera, the image information to a service server that is an upper level system, and the service server may produce the plurality of 2D images through decoding using the image information.

The compressing of the image information may include dividing the 2D image based on areas for depths, classifying the divided images for the depths, calculating shifting pixel values for the images, which are compared with a reference image, based on a correlation between the images classified for the depths, performing shifting of the images based on the shifting pixel values and performing compression operations on the images of the corresponding depths to determine one representative image, and repeating calculating of shifting pixel values and the determining of one representative image to determine the representative images for the depths, and the method may further include transmitting the representative images for the depths and the shifting pixel values of all the images corresponding to the depths to a service server that is an upper level system.

The service server may decode the representative images for the depths and the shifting pixel values of all the images corresponding to the depths to the plurality of 2D images and produce a 3D image from the plurality of decoded 2D images.

In accordance with another aspect of the inventive concept, there is provided a system implemented by a computer, including a memory in which at least one program is loaded, and at least one processor, wherein the at least one processor is configured to process a process of, under the control of the program, compressing image information for a plurality of 2D images produced by a plurality of cameras, by using a spatial correlation between the plurality of 2D images.

The image information may include control information that represents representative images for depths and a spatial correlation between the images.

The process of compressing the image information may include a process of determining at least one representative image by using a compression operation of determining one representative value based on a plurality of values for the 2D images having the spatial correlation.

The at least one processor may be further configured to transmit the image information to a service server that is an upper level system, under the control of the program, and the service server may produce a 3D image from the plurality of 2D images, by producing the plurality of 2D images through decoding using the image information.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, exemplary embodiments of the inventive concept will be described in detail with reference to the accompanying drawings.

The embodiments of the inventive concept relate to a technology of image processing and data transmission in a network-based multi-camera environment, and more particularly, to a technology of image processing and data transmission that, when a wired/wireless multi-camera array or a wireless light-field camera is used, reduces a transmission overhead caused when images photographed by cameras are transmitted to a base station or a hub terminal, or an upper level system such as a server computer and maximally ensures the quality of an original 3D image.

Figure 1:
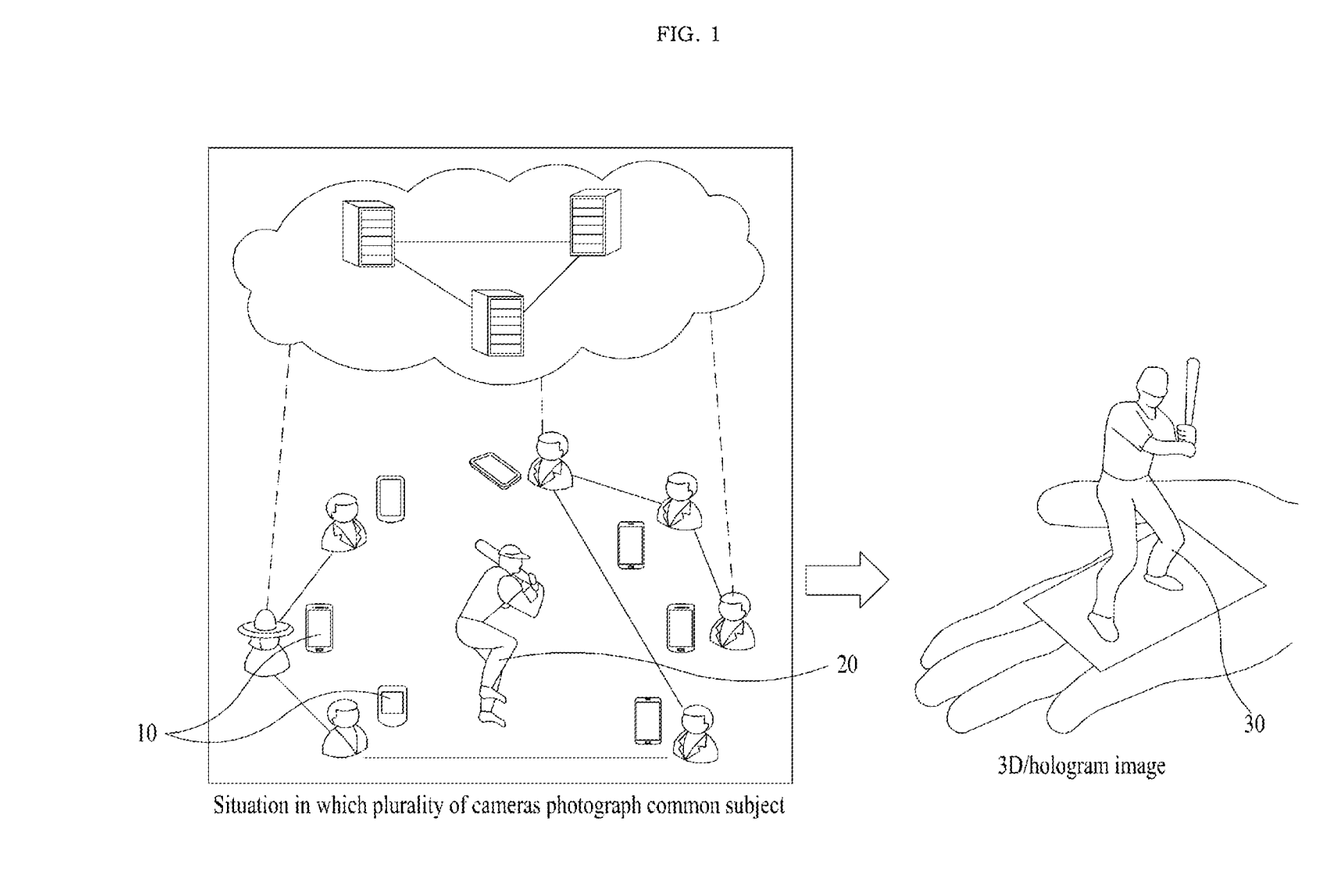
FIG. 1 is an exemplary view illustrating an example of a 3D image service that provides a 3D image in a network-based multi-camera environment in an embodiment of the inventive concept.

FIG. 1 is an exemplary view illustrating an example of a 3D image service that provides a 3D image in a network-based multi-camera environment in an embodiment of the inventive concept.

Referring to FIG. 1, a plurality of cameras 10 may photograph a common subject 20 and transmit 2D images for the subject 20 to a service server (not illustrated) that provides a 3D image service, and the service server may produce a 3D image 30 such as a hologram by using the 2D images received from the plurality of cameras 10 and provide the produced 3D image 30 to users. Then, the cameras provide depth map information of the 2D images for production of the 3D image 30 in the service server, and accordingly, the service server may produce the 3D image 30 for the 2D images by utilizing the depth map information received from the plurality of cameras 10.

Figure 2:
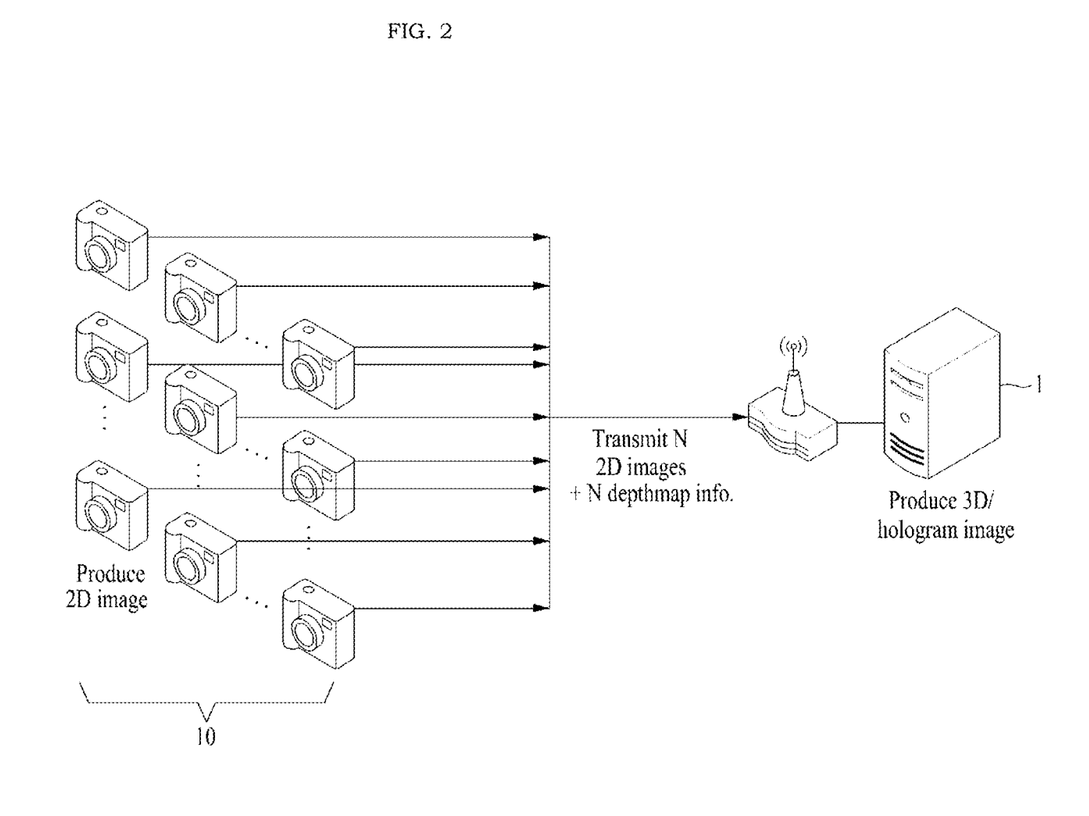
FIG. 2 is an exemplary view illustrating an existing data transmission scheme in a network-based multi-camera environment.

FIG. 2 is an exemplary view illustrating an existing data transmission scheme in a network-based multi-camera environment.

In an existing technology, as illustrated in FIG. 2, N cameras 10 produce 2D images, respectively, and individually transmit the 2D images to the service server 1. In the existing technology, because the service server 1 receives the 2D images from the cameras 10, respectively, it receives N 2D images and depth map information in correspondence to the number of cameras 10. Then, there is not preliminary processing between the cameras 10 except for producing the 2D images for the subject.

In the existing technology, because the 2D images and the depth map information corresponding to the number N of the cameras 10 are transmitted in a form in which the cameras 10 individually transmit data to produce a 3D image in a network-based multi-camera environment, a large amount of communication is necessary.

The inventive concept may use a spatial correlation between the images captured by the different cameras for a common target to reduce an amount of communication resources, improve an efficiency and performance of a network.

Figure 3:
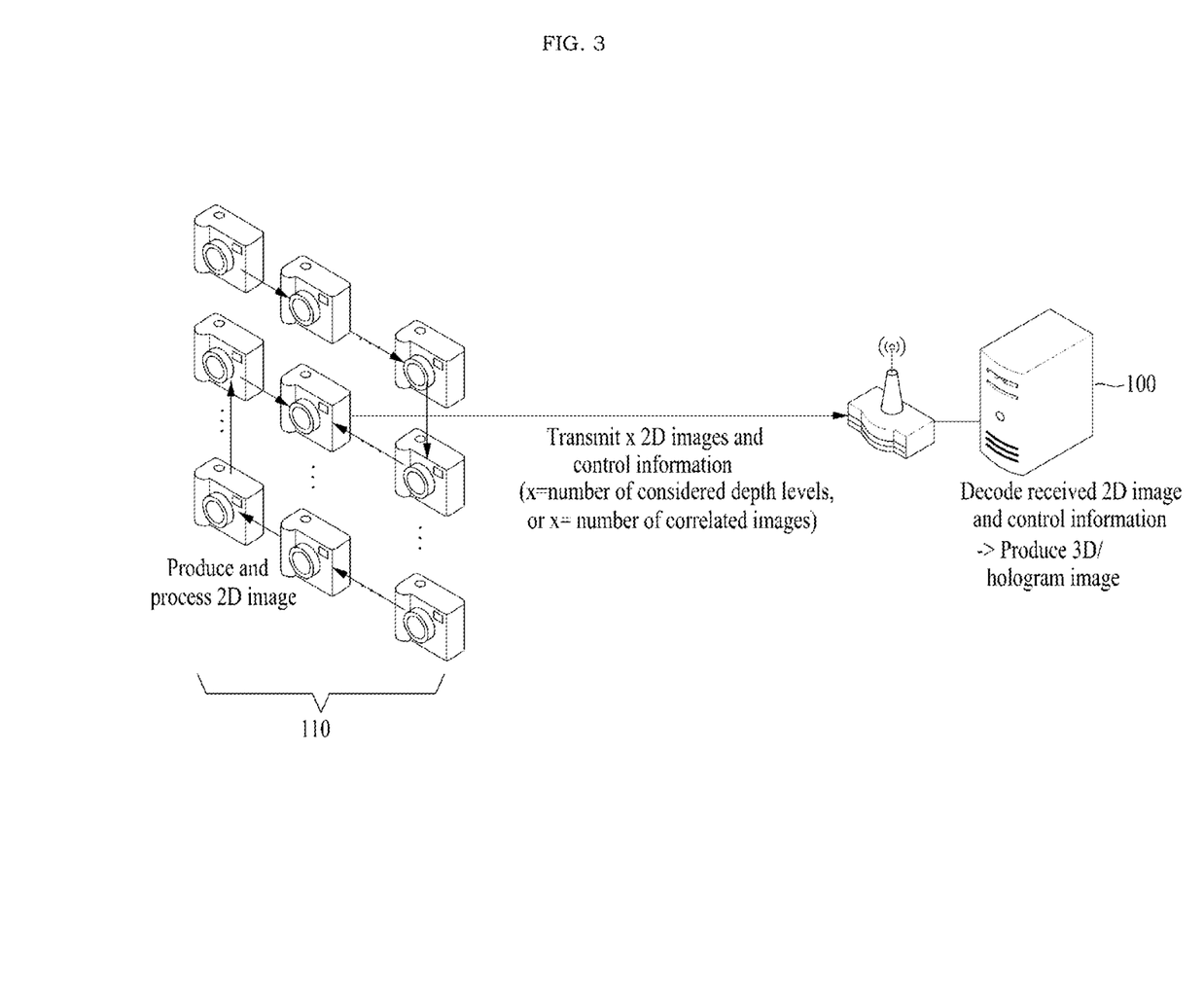
FIG. 3 is an exemplary view illustrating an example of a network-based multi-camera environment and a data transmission scheme in an embodiment of the inventive concept.

FIG. 3 is an exemplary view illustrating an example of a network-based multi-camera environment and a data transmission scheme in an embodiment of the inventive concept.

FIG. 3 illustrates an example in which a network environment includes a plurality of electronic devices 110 and a service server 100. FIG. 3 is a simple example for describing the inventive concept, and the number of electronic devices and the number of servers are not limited to those of FIG. 3.

A plurality of electronic devices 110 may be fixed terminals or mobile terminals that are realized by computer devices having a camera function. The plurality of electronic devices 110, for example, may include cameras, smartphones, mobile phones, navigation systems, computers, notebooks, digital broadcasting terminals, personal digital assistants (PDAs), portable multimedia players (PMPs), and tablet PCs. As an example, the plurality of electronic devices 110 may communicate with a service server 100 through a network (not illustrated) by using a wireless or wired communication scheme.

A communication scheme of the plurality of electronic devices 110 and the service server 100 is not limited, and may include short range wireless communication between devices as well as a communication scheme that utilizes a communication network (for example, a mobile communication network, a wired internet, a wireless internet, or a broadcasting network) that may be included in a network. For example, the network may include at least one of networks such as a personal area network (PAN), a local area network (LAN), a campus area network (CAN), a metropolitan area network (MAN), a wide area network (WAN), a broadband network (BBN), and the internet. Further, the network may include at least one of network topologies including a bus network, a star network, a ring network, a mesh network, a star-bus network, and a tree or hierarchical network, but the inventive concept is not limited thereto.

The service server 100 may communicate with the plurality of electronic devices 110 through a network, and may be realized by a computer device or a plurality of computer devices that provide a command, a code, a file, content, a service, and the like.

The plurality of electronic devices 110 are computer devices having a camera function of producing and transmitting a 2D image, and hereinafter will be generally referred to as 'cameras'. As illustrated in FIG. 3, the plurality of cameras 110 may perform a processing of transmitting and receiving and processing 2D images of the cameras as a concept of in-network computation. In other words, transmission and preliminary processing of data is present as preliminary processing between the cameras 110.

According to the inventive concept, the 2D images and control information processed by one of the plurality of cameras 110 may be transmitted to the service server 100. In other words, x 2D images and control information may be transmitted through preliminary processing of one of the N cameras 110. Then, x may denote the number of depth levels or the number of correlational images. Further, the control information may include information that represents a spatial correlation between images.

One of the plurality of cameras 110 may receive all of the 2D images and depth map information of the other cameras, and may preliminarily process the received 2D images and depth map information at once, or preliminarily process the received 2D images and depth map information by several cameras in a dispersive way.

All of the plurality of cameras 110 may be reference cameras that transmit x 2D images and control information. The reference cameras may be determined in consideration of various factors, such as a communication environment or an energy efficiency, and for example, one of the plurality of cameras 110, which has the best communication link, may be determined as a reference camera.

The service server 100 may decode the x 2D images and control information received from the reference camera of the N cameras 110 to produce N individual 2D images and produce a 3D image from the N 2D images.

Accordingly, the inventive concept may compress information captured by the plurality of cameras through preliminary processing of the cameras when the cameras cooperate with each other to produce a 3D/hologram image to remarkably reduce an amount of information that is to be transmitted for production of a 3D/hologram image.

Figure 4:
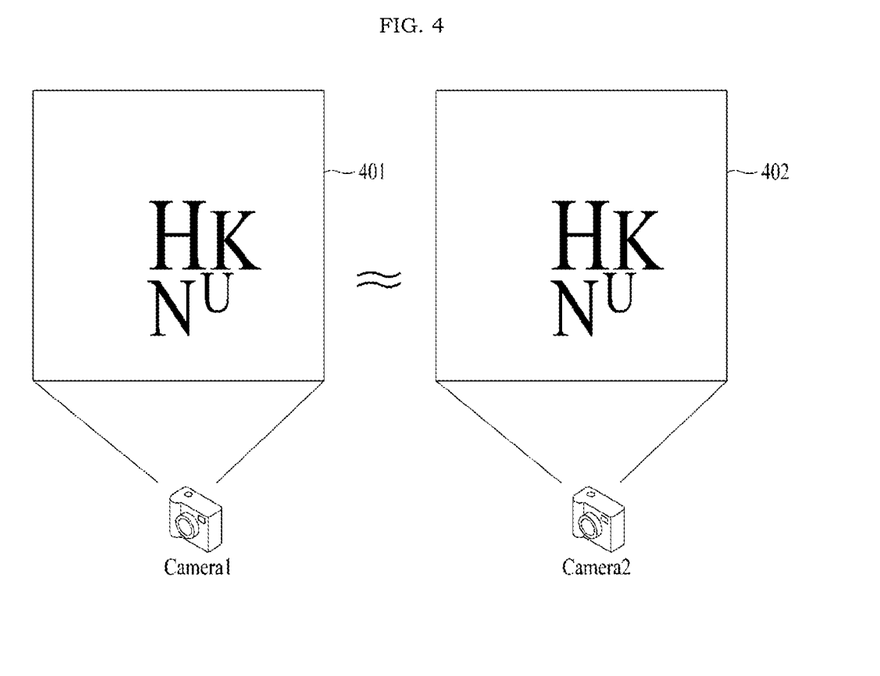
FIG. 4 is an exemplary view illustrating an example of images having a high correlation in an embodiment of the inventive concept.

As illustrated in FIG. 4, a spatial correlation is present in the 2D images 401 and 402 captured by the cameras camera1 and camera2 for one common target. Then, the 2D images 401 and 402 have high spatial correlations in respective depth levels for objects included in the images.

The inventive concept does not individually transmit the 2D images produced by the cameras, but determines one representative value through compression operations for image groups having high correlations (for example, for depth levels) and transmits the representative value. An example of a compression operation may include a min operation of selecting a minimum value of several values as a representative value, a max operation of selecting a maximum value of several values as a representative value, and an average operation of selecting an average value of several values as a representative value (a method of averaging elements while the ratios of the elements are the same or a method of averaging elements while the ratios of the elements are different), but the inventive concept is not limited thereto and any operation of determining one representative value based on several values may be applied.

Figure 5:
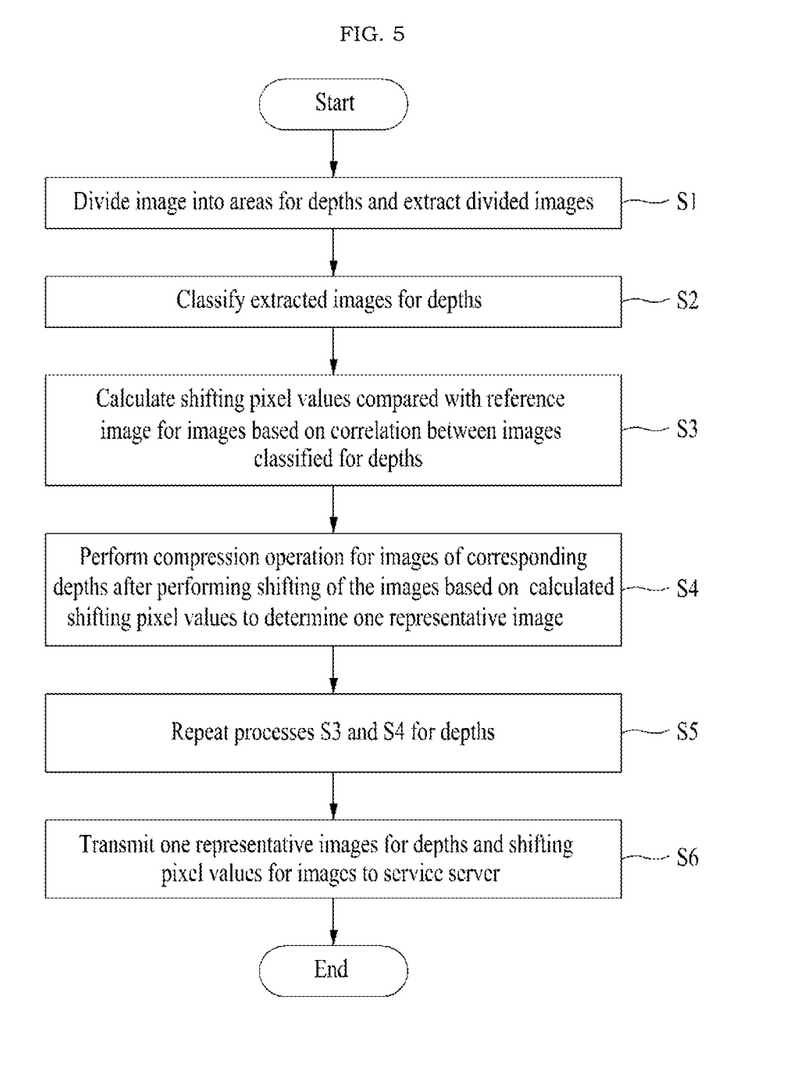
FIG. 5 is a flowchart illustrating an example of a method for image processing and data transmission in a network-based multi-camera environment in an embodiment of the inventive concept.

FIG. 5 is a flowchart illustrating an example of a method for image processing and data transmission in a network-based multi-camera environment in an embodiment of the inventive concept. In the method for image processing and data transmission in a network-based multi-camera environment, operations may be performed by an electronic device (hereinafter, referred to as 'camera') having a camera function. Then, the method for image processing and data transmission in a network-based multi-camera environment corresponds to a preliminary processing process for cameras, and the targets of the method are images obtained by photographing a common target and having a spatial correlation. Further, although it is described that the method for image processing and data transmission in a network-based multi-camera environment is performed by a camera that is designated as a reference camera, the inventive concept is not limited thereto but the method may be performed by two or more cameras in a dispersive way.

Figure 6:
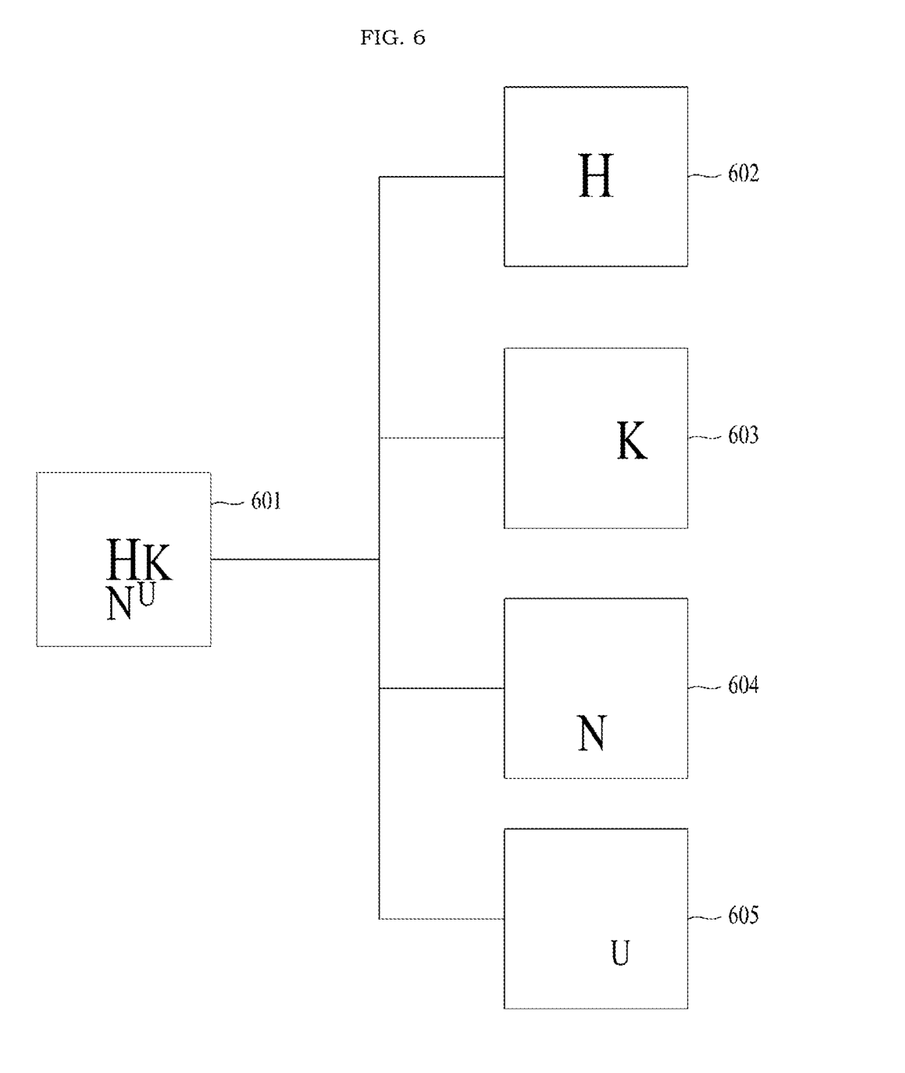
FIGS. 6 to 8 are exemplary views illustrating a representative image and control information processed by one camera of a plurality of cameras in an embodiment of the inventive concept.

In operation S1, a camera may divide a 2D image captured by the camera or received from another camera based on areas for depths and extract the divided 2D images. As illustrated in FIG. 6, images 602 to 605 for objects may be divided by extracting objects included in the 2D image.

In operation S2, the camera may classify the images extracted from the 2D image for depths.

In operation S3, the camera may calculate shifting pixel values for images, which are compared with a reference image, based on a correlation between the images classified for the depths. Then, the shifting pixel values may be calculated by comparing object locations of the images. In other words, the shifting pixel values of all the cameras may be calculated for the objects with reference to the reference camera.

A shifting pixel value {x, y} may be represented by {the number of horizontally shifting pixels, the number of vertically shifting pixels}. Then, the number of horizontally shifting pixels may be defined by {(the x-axis resolution of image×the focal length of the cameras×the interval between the cameras)/(the x-axis size of the image sensors of the cameras×the depth of the image sensors of the cameras)}.

In step S4, the camera may perform shifting of the corresponding image based on the shifting pixel values calculated in operation S3 and perform a specific compression operation on the images of the corresponding depths to determine one representative image. This process is directed to calculating and compressing image information having a high correlation between the cameras, and image information of the cameras is gathered along a specific path. For example, the images having a high correlation may be gathered as one representative value, by using a compression operation, to which one of a min function, a max function, an average function, and a weighted average function is applied. Then, a combination path may be determined based on an operation method used when the images having a high correlation are gathered.

In operation S5, the camera may repeat the processes S3 and S4 for the depths. The processes S3 and S4 may be independently performed for the depths, and through this, one representative image for respective depths and the shifting pixel values of all the images corresponding to the depths may be induced. In a camera array environment, after shifting of an object is performed, an operation of gathering images may be repeatedly and continuously applied. That is, shifting of an object and a gathering operation may be repeated until all images are calculated as one image. Meanwhile, the shifting of an object and the gathering operation may be applied to each of RGB. Information produced for pixels of charged coupling devices of the camera sensors may be defined, and then, information of 24 bits per pixel may be produced if the RGB correspond to 8 bits (e.g., (255, 255, 255) or #FF00F0 (hexadecimal) and information of 48 bits per pixel may be produced if RGB correspond to 16 bits.

In operation S6, as the processes S3 and S4 are repeated for depths, the camera may transmit one representative image for the induced depths and shifting pixel values for the images corresponding to the depths. In other words, the camera may transmit a representative image (2D image) of images (images for depth levels) having a high correlation, which is determined through a representative value operation (i.e., a gathering operation), and the number of shifting pixels of all cameras to a reception terminal of the service server 100. Then, the representative image may include x 2D images corresponding to the number of depth levels that are considered for N cameras through extraction of an object. As an example, the camera may transmit the representative images for the depth levels and information on the number of shifting pixels for all cameras to the reception terminal of the service server 100, together with information on a resource overhead that is necessary for transmission of data between the cameras. The information on the resource overhead that is necessary for transmission of data between the cameras is not present in the case of a wired camera array and is prevent only in a wireless case. As another example, the camera may transmit the representative images for the depth levels and information on the average number of shifting pixels for all cameras to the reception terminal of the service server 100, together with information on a resource overhead that is necessary for transmission of data between the cameras.

Figure 7:
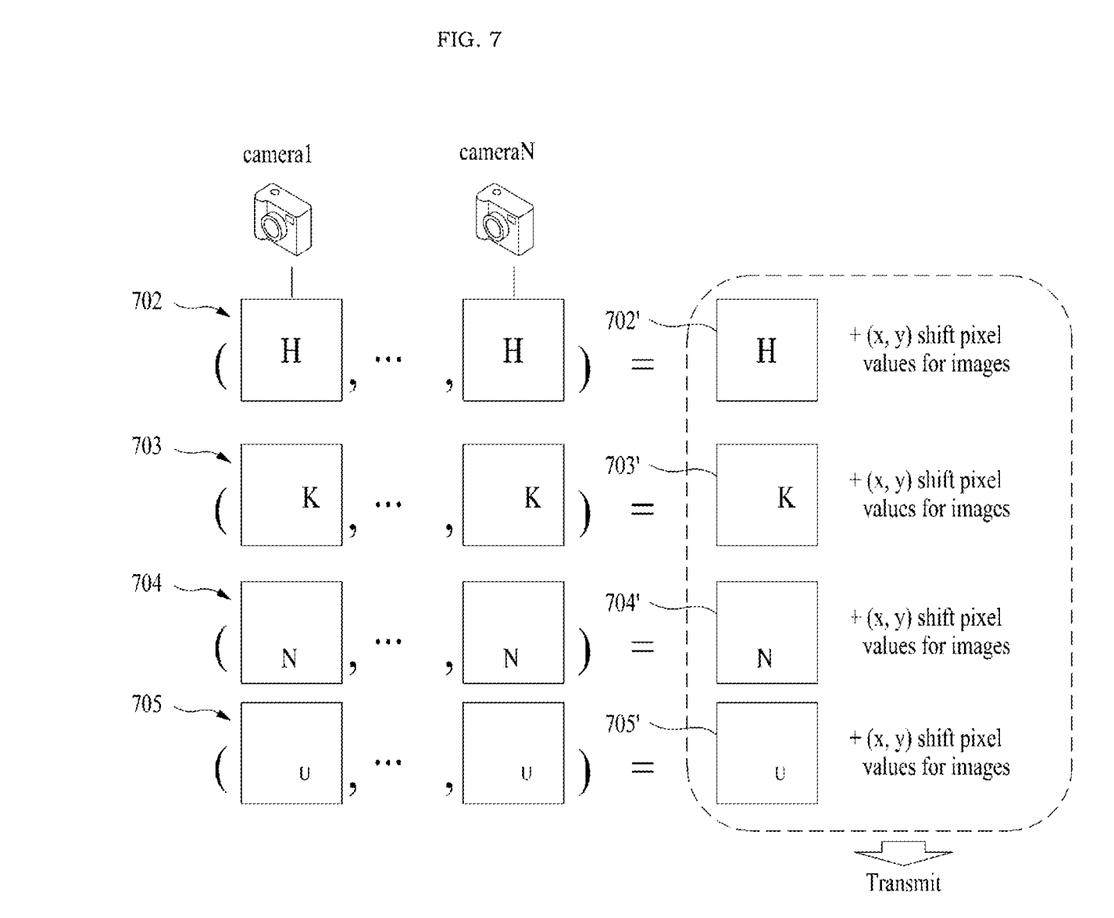

Referring to FIG. 7, among the object images 702 to 705 having a high correlation for the N cameras camera1 and camera2 that produce 2D images for a common target, representative images 702' to 705' are determined through a min operation, a max operation, an average operation, a weighted average operation, and the like, and the shifting pixel value for the images for all the cameras may be transmitted to the service server 100 together with the representative images 702' to 705' for the depths.

Figure 8:
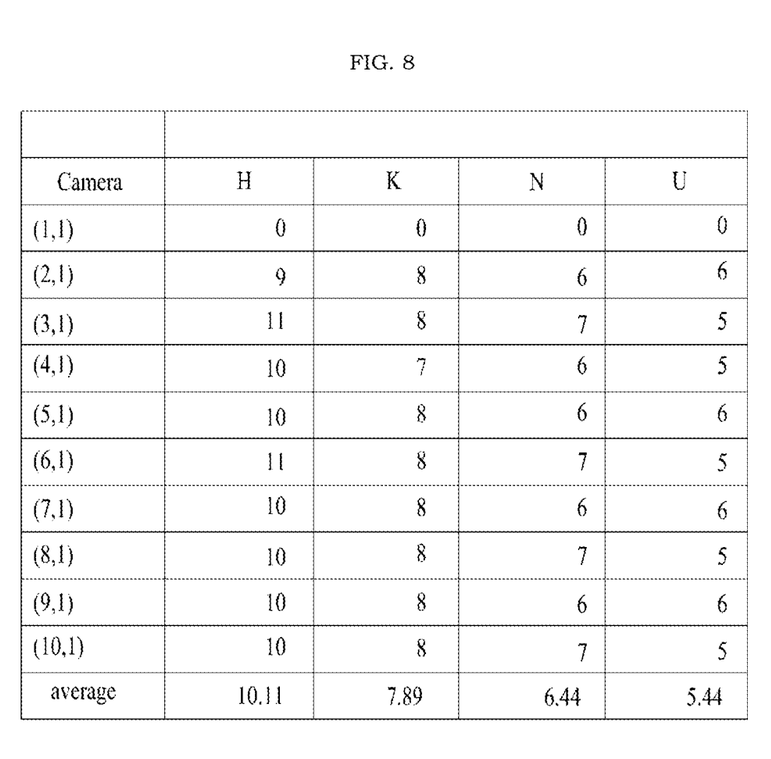

As an example, when the shifting pixel values for the depths of the 2D images processed by the reference camera for the 10 2D images captured through the 10 cameras are as illustrated in FIG. 8, an average value of 10.11 of the numbers of the shifting pixels for an object H, an average value of 7.89 of the numbers of the shifting pixels for an object K, an average value of 6.44 of the numbers of the shifting pixels for an object N, and an average value of 5.44 of the numbers of the shifting pixels for an object U may be transmitted to the service server 100 as control information related to the 10 2D images.

For example, there may be two methods for producing (determining) one representative image for each depth.

One is a method of fixing one of a plurality of cameras as a reference camera and searching for shifting pixel values of images captured by all the remaining cameras with reference to the image captured by the reference camera to perform an operation.

The other one is a method of continuously performing an operation between two of a plurality of cameras. In this case, the reference camera continues to change. For example, when an operation is performed on No. 1 camera and No. 2 camera and No. 2 camera is a reference camera, area for depths are extracted in image 1 captured by No. 1 camera and image 2 captured by No. 2 camera are extracted and the shifting pixels of the image areas of No. 1 camera are calculated with reference to No. 2 camera. Then, image 2' corresponding to the operation result for No. 1 camera and No. 2 camera is obtained based on the calculated result. Next, when image 2' and image 3 captured by No. 3 camera are operated, No. 3 camera becomes a reference camera and accordingly image 3' may be produced. Thereafter, image 3' is used to perform an operation with No. 4 camera. If x depth area are extracted from an image and the process is perform x times, and through this, a total of x images are obtained.

Figure 9:
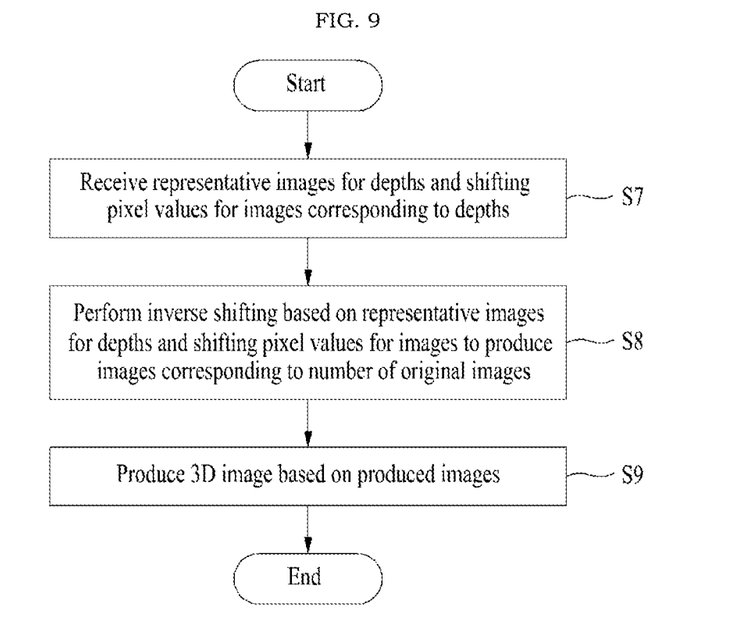
FIG. 9 is a flowchart illustrating an example of a process of producing a 3D image in an embodiment of the inventive concept.

FIG. 9 is a flowchart illustrating an example of a process of producing a 3D image in an embodiment of the inventive concept. In the method of producing the 3D image of FIG. 9, steps may be performed by the service server 100.

In operation S7, the service server 100 may receive one representative image for depths and shifting pixel values for images corresponding to the depths from a reference camera as a request for a 3D image for the 2D images captured by a plurality of cameras.

In operation S8, the service server 100 may perform unshifting based on the representative image for the depths and the shifting pixel values for the images to produce images corresponding to the number of the original images captured by the plurality of cameras. In other words, the service server 100 may produce image corresponding to the number of the original images by applying the shifting pixel values for images to the representative images for the depths. Accordingly, the service server may decode the x representative images received from the reference camera for the plurality of cameras and control information (the number of shifting pixels of all the cameras) to N original 2D images corresponding to the number of the cameras.

In operation S9, the service server 100 may produce a 3D image such as a hologram image by using the images produced in operation S8, that is, the N 2D images. Then, the service server 100 may decode the representative images to the original images by applying a method of performing unshifting according to the number of the shifting pixels of the cameras to produce a 3D image based on the images, and may provide the produced 3D image as a response to the request for a 3D image.

In this way, a plurality of cameras may cooperate with each other to maximally ensure a quality of the original image while remarkably reducing an amount of information that is to be transmitted to the service server 100 through processing of the cameras.

Figure 10:
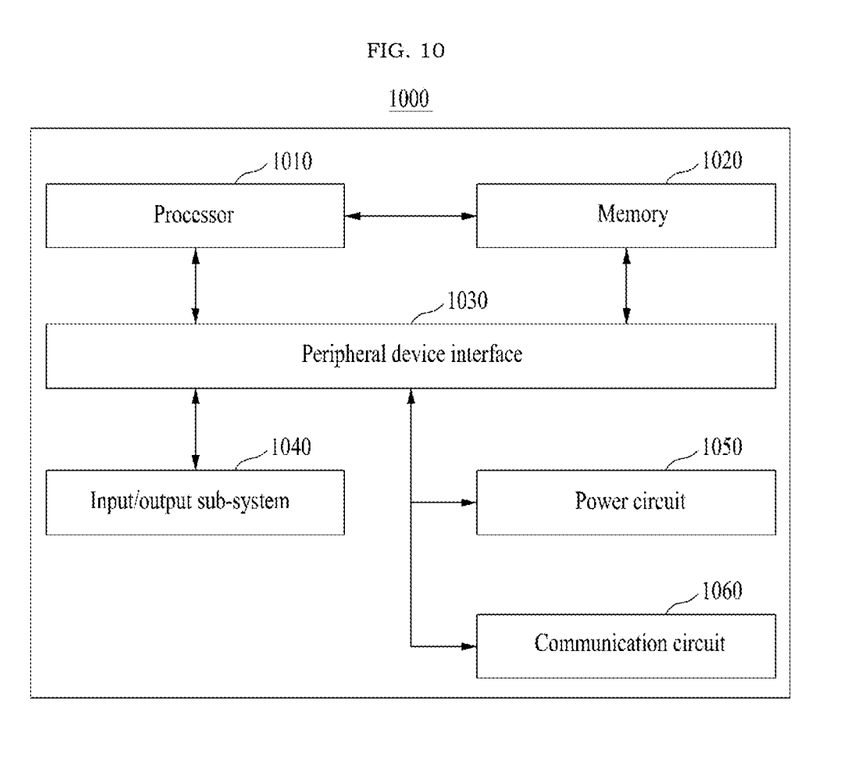
FIG. 10 is a block diagram illustrating an example of an internal configuration of a computer system in an embodiment of the inventive concept.

FIG. 10 is a block diagram illustrating an example of an internal configuration of a computer system in an embodiment of the inventive concept.

Referring to FIG. 10, the computer system 1000 may include at least one processor 1010, a memory 1020, a peripheral interface 1030, an input/output (I/O) sub-system 1040, a power circuit 1050, and a communication circuit 1060. Then, the computer system 1000 may correspond to the electronic device having a camera function, which has been described with reference to FIG. 1, or the service server.

The memory 1020, for example, may include a high-speed random access memory, a magnetic disk, an SRAM, a DRAM, a ROM, a flash memory, and a nonvolatile memory. The memory 1020 may include a software module that is necessary for an operation of the computer system 1000, an instruction set, or other various data. Then, access of the processor 1010 or another component such as the peripheral interface 1030 to the memory 1020 may be controlled by the processor 1010.

The peripheral interface 1030 may couple an input and/or output peripheral device of the computer system 1000 to the processor 1010 and the memory 1020. The processor 1010 may execute a software module or an instruction set stored in the memory 1020 to perform various functions for the computer system 1000 and process data.

The input/output sub-system 1040 may couple various input/output peripheral devices to the peripheral interface 1030. For example, the input/output sub-system 1040 may include a camera, a monitor or a keyboard, a mouse, a printer, and a controller for coupling a peripheral device such as a touchscreen or a sensor to the peripheral interface 1030. According to another aspect, the input/output peripheral devices may be coupled to the peripheral interface 1030 not via the input/output sub-system 1040.

The power circuit 1050 may supply electric power to all or some of the components of the terminal. For example, the power circuit 1050 may include a power management system, at least one power source such as a battery or an AC power source, a charging system, a power failure detection circuit, a power converter or an inverter, a power state indicator or other components for producing, managing, and distributing electric power.

The communication circuit 1060 may allow communication with another computer system by using at least one external port. Further, as described above, if necessary, the communication circuit 1060 may include an RF circuit to transmit and receive an RF signal that is also known as an electromagnetic signal to allow communication with another computer system.

The embodiment of FIG. 10 is a simple example of the computer system, and some components of FIG. 10 may be omitted from the computer system 1000, an additional component may be further included to the computer system 1000 of FIG. 10, or two or more components may be coupled or disposed. For example, the computer system for a communication terminal of a mobile environment may further include a touchscreen or a sensor in addition to the components of FIG. 10, and may include a circuit for RF communication of various communication schemes (Wi-Fi, 3G, LTE, Bluetooth, NFC, and ZigBee) in the communication circuit 1060. The components that may be included in the computer system 1000 may be realized by hardware including an integrated circuit specified for processing of one or more signals or an application, software, or a combination of hardware and software.

In this way, according to embodiments of the inventive concept, a transmission overhead caused when the images captured by the cameras are transmitted to a base station or a hub terminal may be reduced and a quality of a final image provided to a user may be maximally ensured by efficiently processing and transmitting information captured by the cameras when the cameras cooperate to produce a 3D/hologram image.

The above-described apparatus may be realized by a hardware element, a software element, and/or a combination of a hardware element and a software element. For example, the apparatus and the elements described in the embodiments may be realized by using one or more general-purpose computer or a specific-purpose computer such as a processor, a controller, an arithmetic logic unit (ALU), a digital signal processor, a microcomputer, a field programmable gate array (FPGA), a programmable logic unit (PLU), a microprocessor, or any device that may execute and respond to an instruction. The processing device may perform an operation system and one or more software applications performed on the operating system. Further, the processing device may access, data, manipulate, process, and produce data in response to execution of software. Although one processing device is used for convenience of understanding, it may be easily understood by those skilled in the art that the processing device may include a plurality of processing elements and/or a plurality of types of processing elements. For example, the processing device may include a plurality of processors or one processor and one controller. Further, another processing configuration, such as a parallel processor, may be possible.

The software may include a computer program, a code, an instruction, or a combination of one or more thereof, and the processing device may be configured to be operated as desired or commands may be made to the processing device independently or collectively. The software and/or data may be permanently or temporarily embodied in any type of machine, a component, a physical device, virtual equipment, a computer storage medium or device, or a signal wave transmitted in order to be interpreted by the processing device or to provide an instruction or data to the processing device. The software may be dispersed on a computer system connected to a network, to be stored or executed in a dispersive method. The software and data may be stored in one or more computer readable recording media.

The method according to the embodiment may be implemented in the form of a program instruction that maybe performed through various computer means, and may be recorded in a computer readable medium. The computer readable medium may include a program instruction, a data file, and a data structure alone or in combination thereof. The program instruction recorded in the medium may be designed or configured particularly for the embodiment or may be a usable one known to those skilled in computer software. An example of the computer readable recording medium may include magnetic media such as a hard disk, a floppy disk, and a magnetic tape, optical recording media such as a CD-ROM and a DVD, magneto-optical media such as a floptical disk, and hardware devices that are particularly configured to store and perform a program instruction, such as a ROM, a RAM, and a flash memory. Further, an example of the program instruction may include high-level language codes which may be executed by a computer using an interpreter as well as machine languages created by using a compiler. The above-mentioned hardware device may be configured to be operated as one or more software module to perform operations of various embodiments, and the converse is applied.

According to embodiments of the inventive concept, a transmission overhead caused when the images captured by the cameras are transmitted to a base station or a hub terminal may be reduced and a quality of a final 3D image provided to a user may be maximally ensured by efficiently processing and transmitting information captured by the cameras when the cameras cooperate to produce a 3D/hologram image.

Although the embodiments of the present disclosure have been described with reference to the limited embodiments and the drawings, the inventive concept may be variously corrected and modified from the above description by those skilled in the art to which the inventive concept pertains. For example, the above-described technologies can achieve a suitable result even though they are performed in different sequences from those of the above-mentioned method and/or coupled or combined in different forms from the method in which the constituent elements such as the system, the architecture, the device, or the circuit are described, or replaced or substituted by other constituent elements or equivalents.

Therefore, the other implementations, other embodiments, and the equivalents of the claims pertain to the scope of the claims.

What is claimed is:
1. A method implemented by a computer, comprising:
   capturing, by a first camera, a first 2D image of a common target;
   receiving, by the first camera over a network, a second 2D image of the common target captured by a second camera; and
   compressing, by the first camera, image information for the first 2D image and the second 2D image into compressed image information using a spatial correla- tion between the first 2D image and the second 2D image, wherein compressing the image information includes,
dividing the first 2D image into a first set of divided images and the second 2D image into a second set of divided images based on areas for depths;
classifying each divided image of the first set of divided images and each divided image of the second set of divided images to a corresponding depth classification of a plurality of depth classifications according to spatial correlation for the depths;
calculating shifting pixel values for individual second divided images of the second set of divided images based on a difference between the individual second divided image and a corresponding divided image of the first set of divided images having the corresponding depth classification to the individual second divided image; and
determining, for each depth classification, a representative image based on the first set of divided images and the second set of divided images and performing compression operations that involve the shifting pixel values for the second set of divided images to determine one or more representative values for the corresponding depth classification.

2. The method of claim 1, wherein compressing of the image information comprises:
determining the representative image for each depth classification by using a compression operation of determining one representative value of a plurality of values for depth classifications for the first 2D image and the second 2D image.

3. The method of claim 1, comprising:
transmitting, by the first camera over the network, the compressed image information to a server that is configured to decode the compressed image information to produce a plurality of 2D images of the common target.

4. The method of claim 1, comprising:
transmitting, by the first camera over the network, the representative images for the depths and the shifting pixel values of the set of divided images corresponding to the depths to a server remotely located to the first camera.

5. The method of claim 4, wherein the representative images are usable by the server to,
generate decoded 2D images by at least decoding the representative images for the depth classifications and the shifting pixel values of all the images corresponding to the depths to the plurality of 2D images, and
produce a 3D image from the decoded 2D images.

6. The method of claim 1, wherein a shifting pixel value is defined as according to a number of horizontally shifting pixels and a number of vertically shifting pixels between corresponding divided images of the first set of divided images and the second set of divided images.

7. The method of claim 1, comprising:
receiving, by the first camera over the network, a third 2D image of the common target captured by a third camera, wherein compressing by the first camera includes:
dividing the third 2D image into a third set of divided images based on the areas for depths;
classifying each divided image of the third set of divided images to the corresponding depth classification according to spatial correlation for the depths;
calculating the shifting pixel values for individual third divided images of the third set of divided images based on a difference between the corresponding divided image of the first set of divided images having the corresponding depth classification to the individual third divided image; and
determining the representative image for each classification is based on the third set of divided images and performing compression operations involves using the shifting pixel values for the third set of divided images to determine the one or more representative values.

8. The method of claim 1, wherein the compressed image information includes, for each depth classification, a set of shifting pixel values and a representative value representative of a depth.

9. The method of claim 1, comprising:
generating, by the first camera, first depth map information for the first 2D image; and
receiving, by the first camera over the network, second depth map information generated by the second camera, wherein the first 2D image is divided into the first set of divided images based on the first depth map information, and the second 2D image is divided into the second set of divided images based on the second depth map information.

10. A camera, comprising:
an imaging element;
a processor; and
memory storing a set of instructions that, as a result of execution by the processor, cause the processor to:
cause the imaging element to capture a first 2D image of a common target and to provide the first 2D image to the processor;
receive, over a network, a second 2D image of the common target captured by a second camera; and
compress image information for the first 2D image and the second 2D image using a spatial correlation between the first 2D image and the second 2D image by performance of a process that causes the processor to:
divide the first 2D image into a first set of divided images and the second 2D image into a second set of divided images based on areas for depths;
classify each divided image of the first set of divided images and each divided image of the second set of divided images to a depth classification of a plurality of depth classifications according to spatial correlation for the depths;
calculate shifting pixel values for each individual divided image based on a difference between the individual divided image and a corresponding, divided image of another set of divided images having a corresponding depth classification to the individual divided image; and
determine, for each depth classification, a representative image based on the shifting pixel values for the each depth classification and performing compression operations that involve the shifting pixel values to determine one or more representative values for the corresponding depth classification.

11. The camera of claim 10, wherein the image information comprises control information that represents the representative images for the depths and a spatial correlation between the first 2D image and the second 2D image.

12. The camera of claim 10, wherein execution of the set of instructions causes the processor to:
repeat the calculating of shifting pixel values and the determining of one representative image to determine the representative images for each of the depths.

13. The camera of claim 10, wherein execution of the set of instructions cause the processor to:
transmit, over the network, the image information to a server separate from the first camera that is configured to produce a 3D image from the plurality of 2D images as a result of decoding using the image information.

* * * * *